United States Patent [19]
Tobagi et al.

[11] Patent Number: 5,734,925
[45] Date of Patent: *Mar. 31, 1998

[54] METHOD FOR SCHEDULING I/O TRANSACTIONS IN A DATA STORAGE SYSTEM TO MAINTAIN THE CONTINUITY OF A PLURALITY OF VIDEO STREAMS

[75] Inventors: Fouad A. Tobagi, Los Altos; Joseph M. Gang, Jr., Saratoga; Randall B. Baird, San Jose; Joseph W. M. Pang, Fremont; Martin J. McFadden, Cupertino, all of Calif.

[73] Assignee: Starlight Networks, Mountain View, Calif.

[ * ] Notice: The term of this patent shall not extend beyond the expiration date of Pat. No. 5,581,784.

[21] Appl. No.: 711,050

[22] Filed: Sep. 10, 1996

Related U.S. Application Data

[63] Continuation of Ser. No. 977,493, Nov. 17, 1992, Pat. No. 5,581,784.

[51] Int. Cl.$^6$ ............................. G06F 13/00; G06F 13/28
[52] U.S. Cl. .................. 395/826; 395/825; 395/841
[58] Field of Search ............................. 395/826, 825, 395/841, 800

[56] References Cited

U.S. PATENT DOCUMENTS

| | | | |
|---|---|---|---|
| 4,536,836 | 8/1985 | Dodd et al. | 364/200 |
| 4,636,946 | 1/1987 | Hartung et al. | 364/200 |
| 4,688,168 | 8/1987 | Gudaitis et al. | 364/200 |

(List continued on next page.)

FOREIGN PATENT DOCUMENTS

| | | |
|---|---|---|
| 458 554 A2 | 11/1991 | European Pat. Off. . |
| 521 630 A3 | 1/1993 | European Pat. Off. . |
| 535 807 A2 | 4/1993 | European Pat. Off. . |
| 701 198 A1 | 3/1996 | European Pat. Off. . |
| WO 90/00280 | 1/1990 | WIPO . |
| WO 91/13404 | 9/1991 | WIPO . |
| WO 92/04674 | 3/1992 | WIPO . |
| WO 94/12937 | 6/1994 | WIPO . |

OTHER PUBLICATIONS

P. Lougher, et al. "Scalable Storage Servers for Digital Audio and Video" Storage and Recording Systems, Invention Conference on Storage & Recording Systems, Conference Publication No. 402, pp. 140–143, 5–7 Apr. 1994.

W. Tetzlaff, et al., "A Method for Evaluating Storage Systems in Distributed and Hierarchical Video Servers" 1994 IEEE, pp. 430–439.

(List continued on next page.)

*Primary Examiner*—Thomas C. Lee
*Assistant Examiner*—Rehana Perreen
*Attorney, Agent, or Firm*—Meltzer, Lippe, Goldstein, et al.

[57] ABSTRACT

A method for operating a disk storage system, comprising a disk and forming part of a communications network, simultaneously maintains the continuity of a plurality of data streams. Typically, each stream transfers video data to or from the disk storage system. Illustratively, each of the data streams is produced in the network at a rate of $W_{base}$ bits/sec and consumed by the disk storage system or produced by said disk storage system and consumed in the network at a rate of $W_{base}$ bits/sec. One I/O transaction is performed for each stream in each of a plurality of I/O cycles of duration $S/W_{base}$, wherein in each I/O transaction a segment of S bits is retrieved from or stored in the disk. The number of streams whose continuity can be maintained in this manner is limited by the number of I/O's which can be performed in a cycle of duration $S/W_{base}$. More generally, when a stream has a bit rate $(A/B)W_{base}$ bits/sec where A and B are integers chosen independently for each stream, then for this stream A I/O transactions are performed in B cycles of duration $S/W_{base}$. If the number of disks is $N_d, N_d \geq 1$, then the I/O cycles have a duration $N_d S/W_{base}$ and then A I/O transactions are performed in each disk for each stream in B I/O cycles.

26 Claims, 12 Drawing Sheets

U.S. PATENT DOCUMENTS

| | | | |
|---|---|---|---|
| 5,008,819 | 4/1991 | Gorbatenko | 364/200 |
| 5,140,683 | 8/1992 | Gallo et al. | 395/425 |
| 5,197,143 | 3/1993 | Lary et al. | 395/425 |
| 5,218,695 | 6/1993 | Noveck et al. | 395/600 |
| 5,220,653 | 6/1993 | Miro | 395/275 |
| 5,261,072 | 11/1993 | Siegel | 395/425 |
| 5,263,145 | 11/1993 | Brady et al. | 395/425 |
| 5,301,297 | 4/1994 | Menon et al. | 395/425 |
| 5,331,417 | 7/1994 | Soohoo | 348/584 |
| 5,440,683 | 8/1995 | Nally et al. | 395/162 |
| 5,448,315 | 9/1995 | Soohoo | 348/722 |

OTHER PUBLICATIONS

A.L. Reddy, et al., "I/O Issues in a Multimedia System", IEEE, pp. 69–74, Mar. 1994.

H.M. Vin, et al., "Designing a Multiuser HDTV Storage Server", IEEE Journal on Selected Areas In Communications, pp. 153–164, Jan. 1993.

G.R. Ganger, et al., "Disk Subsystem Load Balancing: Disk Striping vs. Conventional Data Placement" 26th International Conference on Systems Science, IEEE, pp. 40–49, Jan. 1993.

F.A. Tobagi, et al., "Streaming RAID™—A Disk Array Management System for Video Files", ACM Multimedia, pp. 393–400, Aug. 1993.

E. Chang, et al., "Scalable Video Data Placement on Parallel Disk Arrays", SPIE, Storage and Retrieval For Images and Video Databases II, vol. 2185, pp. 208–212, Feb. 1994.

T. Chiueh, et al., "Multi–Resolution Video Representation for Parallel Disk Arrays", Proceed in ACM Multimedia, pp. 401–409, Aug. 1993.

S. Ghandeharizadeh, et al., "An Overview of Techniques to Support Continuous Retrieval of Multimedia Objects", Computer Architecture News, vol. 21, No. 5, pp. 39–46, Dec. 1993.

P. Lougher, et al. "The Design and Implementation of a Continous Media Storage Server", Lecture Notes in Computer Science, Network and Operating System Support for Digital Audio and Video, Third International Workshop, La Jolla, California, Proceedings, pp. 70–78, Nov. 1992.

J. Gemmell, et al., "Principles of Delay–Sensitive Multimedia Data Storage and Retrieval" ACM Transactions on Information Systems, vol. NO. 1, pp. 51–50, Jan. 1992.

P.V. Rangan, et al., "Designing File Systems for Digital Video and Audio", Operating Systems Review, Proceeding of the 13th ACM Symposium on Operating Systems Principles, ACM Press, vol. 25, No. 5, pp. 81–94, Oct. 1991.

P.S. Yu, et al., "Design and Analysis of a Grouped Sweeping Scheme for Multimedia Storage Management", Lecture Notes in Computer Science, Network and Operating System Support for Digital Audio and Video, Third International Workshop, La Jolla, California, Proceedings, pp. 44–55, Nov. 1992.

G. Weikum, et al., "Dynamic File Allocation in Disk Arrays" SIGMOD Record, No. 2, pp. 406–415, Jun. 1991.

D.P. Anderson, et al., "A File System for Continuous Media", ACM Transactions on Computer Systems, vol. 10, No. 4, pp. 311–337, Nov. 1992.

H.M. Vin, et al., "Admission Control Algorithms for Multimedia On–Demand Servers", Multimedia Library, Dept. of Computer Science and Engineering, University of California at San Diego, pp. 56–68, undated.

H. Katseff, et al., "On the Synchronized Display of Multiple Full–Motion Video Streams", IEEE 1991.

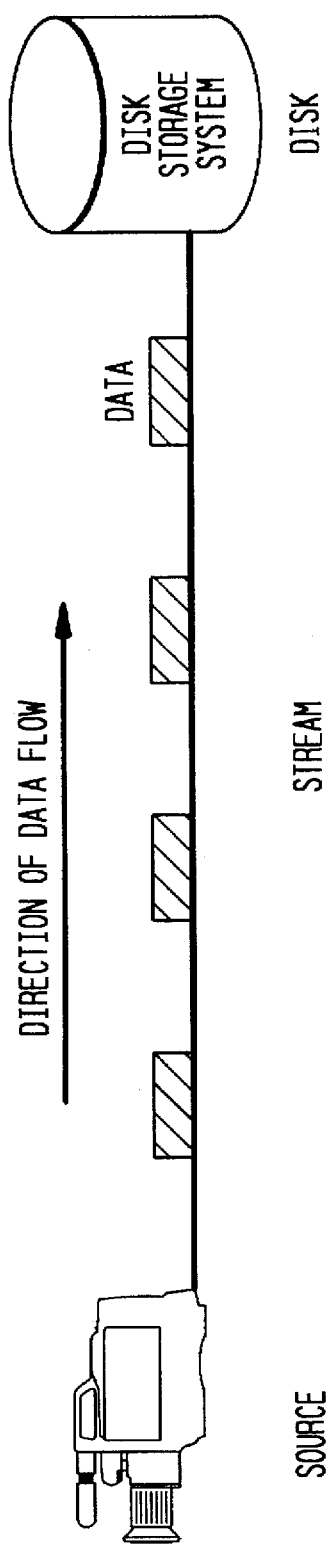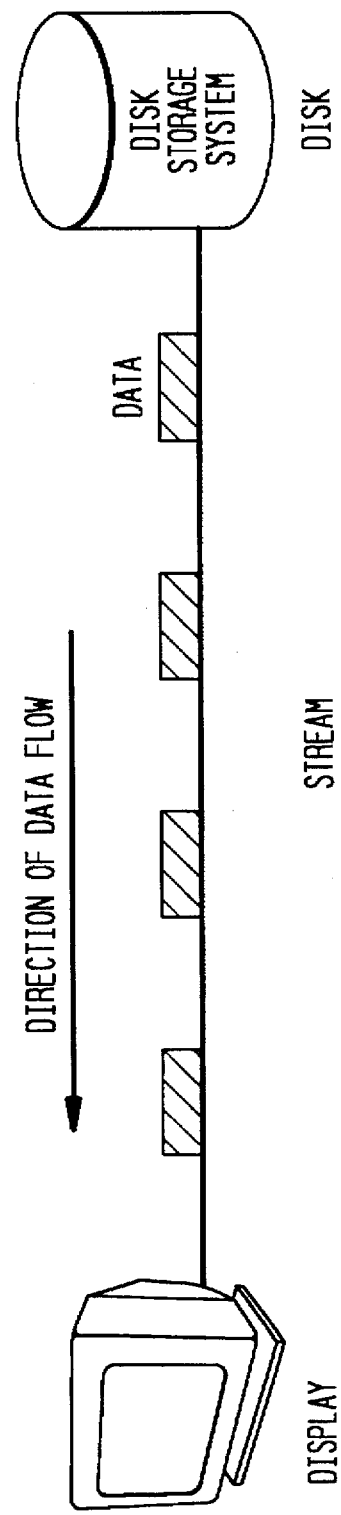

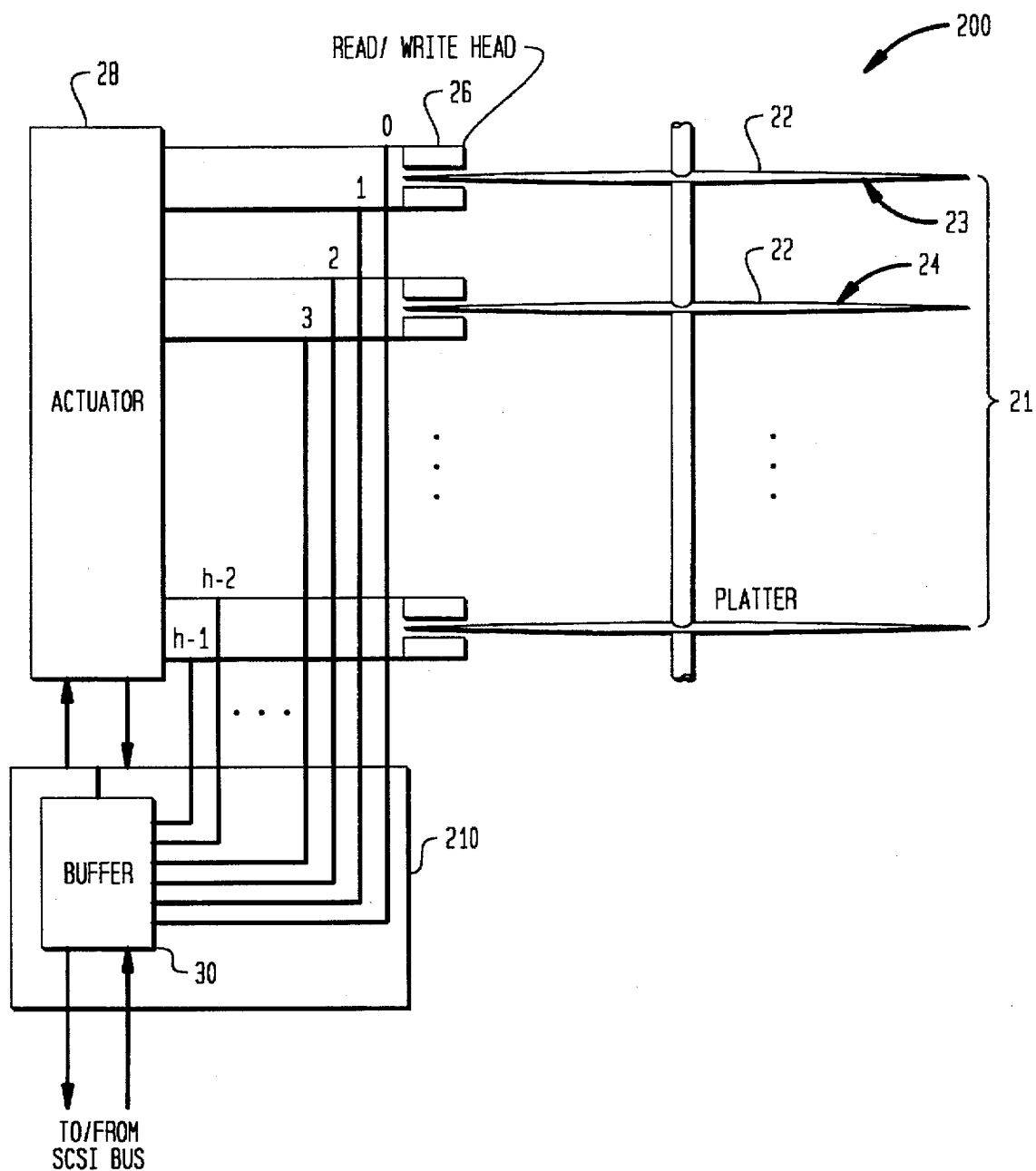

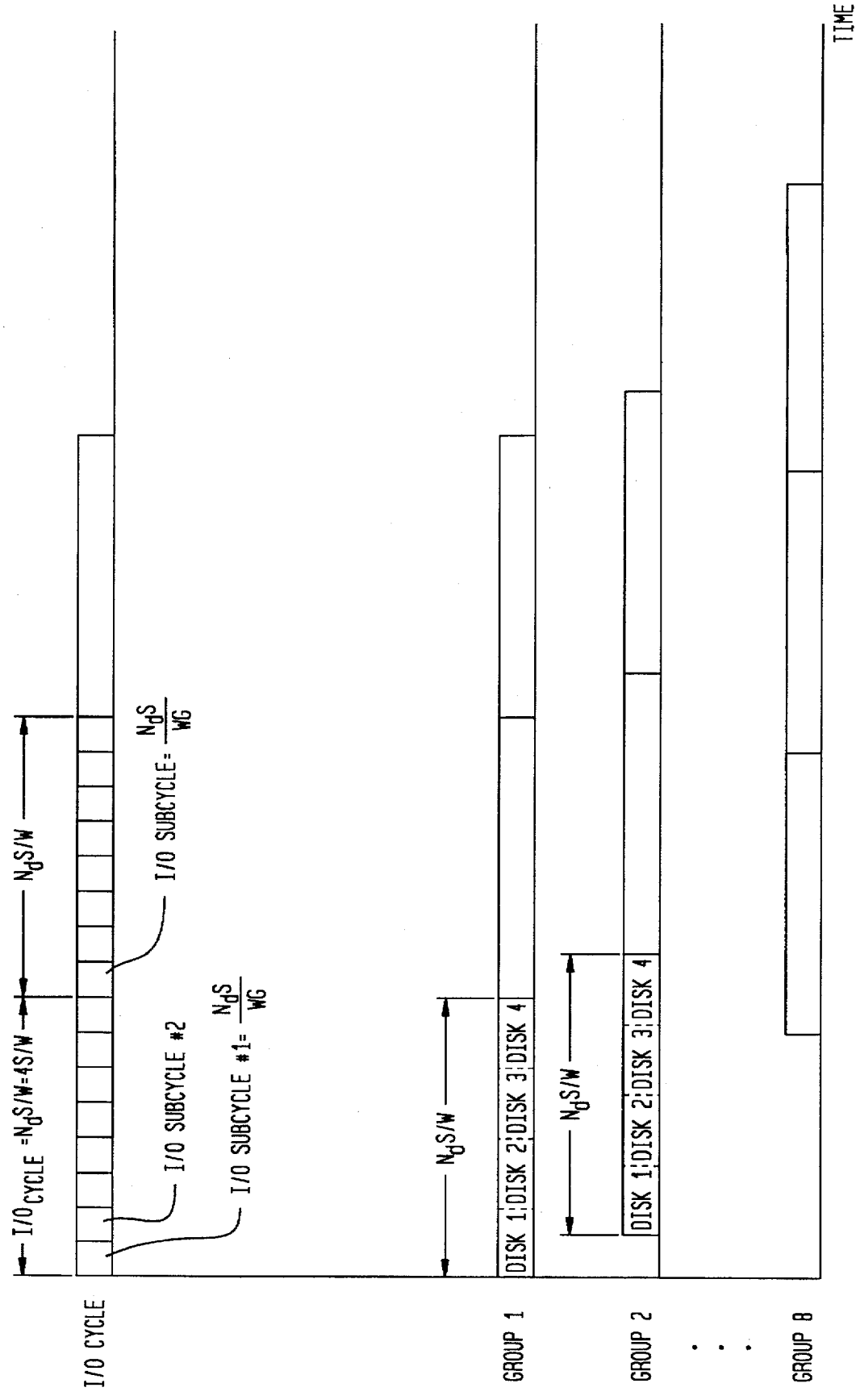

METHOD FOR SCHEDULING I/O TRANSACTIONS IN A DATA STORAGE SYSTEM TO MAINTAIN THE CONTINUITY OF A PLURALITY OF VIDEO STREAMS

This is a continuation of application Ser. No. 07/977,493 filed Nov. 17, 1992 now U.S. Pat. No. 5,581,784.

FIELD OF THE INVENTION

The present invention relates to a method for operating a storage system such as a disk storage system. In accordance with the invention, I/O transactions for the disk storage system are scheduled so that the continuity of a plurality of streams is simultaneously maintained. In a network, the inventive method allows a plurality of users to independently and simultaneously access the disk storage system to store and retrieve stream oriented data such as that found in digital video and audio applications. The invention is also applicable to a stand-alone system wherein a disk storage system is accessed to retrieve or store data belonging to a plurality of streams. The streams, for example, are retrieved from the disk storage system for display locally on a monitor or received from an external source for storage in the disk storage system.

BACKGROUND OF THE INVENTION

One application of the inventive method for operating a disk storage system is in a network such as a local area network.

A Local Area network (LAN) for handling video data is illustrated in FIG. 1. The network 10 comprises a shared transmission medium 12 and a plurality of stations 14 connected to the shared transmission medium. In addition, a server 16 is connected to the shared transmission medium. A disk storage system 20 for storing a plurality of video files is connected to server 16. A plurality of the stations 14 typically wish to access the disk storage system simultaneously to retrieve video files stored in the disk storage system or to write video files into the disk storage system. As indicated above, the invention is also applicable to a stand-alone system wherein a disk storage system is accessed to retrieve streams for display on a local monitor or a disk storage system is accessed to store streams received from an external source.

Streaming data differs from transactional data as follows. With transactional data applications, the data rate associated with the traffic source is highly variable, i.e. it exhibits a high peak-to-average ratio. In contrast, the data rate associated with the transmission of a stream is relatively constant and is generally higher than the average rate associated with a transactional source.

In stream oriented applications such as video, the process according to which data is produced by a source (e.g., a disk storage system) and consumed by a destination (e.g., a decoder at an end-user station) is relatively continuous and steady. As far as the storage system is concerned, two distinct but similar operations are of interest: (i) the recording of streams produced by sources in which case the storage system is the consumer, (ii) the playback of previously recorded stream-oriented files in which case the storage system is the source. These processes are schematically illustrated in FIG. 2 and FIG. 3, respectively.

The storage requirements for streaming data such as video and multimedia data are different than the storage requirements for typical LAN data which is transactional in nature. The size of the files is an order of magnitude greater or more. Even with compression techniques, the physical storage needs are large. While laser disks and CD ROMs provide cost effective storage, they are awkward for providing simultaneous access to multiple users. A preferred storage medium for video files is the magnetic disk storage system.

A magnetic disk storage system 20 is illustrated in FIG. 4A. The disk storage system 20 comprises a plurality of disk drives 200. Each disk drive 200 comprises a disk 21 and a controller 210. The disk drive 200 is shown in greater detail in FIG. 4B. As shown in FIG. 4B, the disk 21 of the disk drive 200 comprises a plurality of platters 22. Each platter 22 has one or two magnetic surfaces, a bottom surface 23 and/or a top surface 24, for recording. Associated with each recording surface 23 or 24 is a read/write head 26. In the disk 21 of FIG. 4B, let h denote the number of heads, and thus, usable surfaces. The heads 26 are moved to particular locations on the platter surfaces 23, 24 by the actuator 28 which is controlled by a controller 210. Thus, the controller 210 controls the proper positions of the read/write heads 26 and the transfer of data in both directions between the magnetic surfaces and a local buffer 30 which forms part of the control 210. The control 210 also manages the transfer of data across the SCSI bus 220 (see FIG. 4A) into and out of a buffer internal to the adapter 230. The adapter 220 is then in charge of the transfer of data, via the system bus 250, into and out of the server computer system 16 which includes the memory of 260, CPU 270, and network interface 280. In the case of a stand-alone system, the computer system 16 may not be a server and may not include a network interface.

As shown in FIG. 5, each recording surface 23, 24 is divided into a number of concentric tracks. Tracks on all surfaces which are located at the same radius form a cylinder. The number of tracks in a cylinder is thus equal to h. Let c denote the number of tracks per surface (and thus also the number of cylinders), and consider the tracks (and thus cylinders) to be numbered sequentially 1, . . . , c, starting with the outer track (cylinder). Each track is divided into a number of fixed size sectors. Due to the circular geometry of the surface, the number of sectors in a track is not the same for all tracks; there being more sectors in outer tracks than in inner tracks.

As shown in FIG. 6, the cylinders in the disk are divided into subsets of contiguous cylinders called zones, such that the number of sectors per track in a zone is the same for all tracks in the zone. We let Z denote the number of zones, and consider the zones to be numbered sequentially from 0 to Z−1 starting with the outer zone on the disk. In FIG. 6, the number of sectors in a track of zone i is designated $\sigma_i$ and the number of cylinders in zone i is designated $k_i$. Note that not all disks are organized into zones.

The disk rotates permanently at a constant speed of R rotations per minute, and the read/write heads are moved all together from one cylinder to another, as needed. All I/O transactions are for an integral number of sectors, the specific number of which depends on the application. To limit the overhead caused by head movement when writing or reading a block of data, the sectors on the disk are used consecutively and sequentially, going from sector to sector on a given track, from track to track in a given cylinder, and from cylinder to cylinder.

An example of a disk drive is the HP C2240 drive which has h=13 read/write heads, a total of c=2051 cylinders, and a rotational speed of R=5400 rotations/minute. The 2,051 cylinders comprise 1981 data cylinders, 69 spares, and one for logs and maintenance information. They are organized into eight zones.

When a request for an I/O operation is placed in the disk storage system (say a read or write operation for some number of consecutive sectors), the heads are first moved to the cylinder where the first sector is located; the delay incurred in this operation is referred to as the seek time ($X_{seek}$). The head corresponding to the appropriate track then waits until the first sector appears under it, incurring a delay referred to as the rotational latency ($X_{ro}$). Once the first sector is located, the head begins reading or writing the sectors consecutively at a rate determined by the rotational speed; the time to read or write all sectors constituting the block is referred to as the transfer time ($X_{transfer}$). Note that if the block of data spans sectors located on more than one track in a given cylinder, then a switch from one head to the next is made at the appropriate time, thus incurring a so-called head switch time. If the block spans sectors located on multiple cylinders, then a head movement from one cylinder to the next takes place, thus incurring a track-to-track seek time each time this occurs. Accordingly, in performing an I/O operation, a certain amount of time is required. To asses the performance of a disk supporting an application, an analysis of the time required in each transaction must be undertaken.

The total time required in performing a read or write operation for a block $T_{I/O}(block)$, is the sum of seek time, rotational latency, and transfer time.

$$T_{I/O}(block)=X_{seek}+X_{ro}+X_{trans}$$

FIG. 7 shows how the total time $T_{I/O}$ for a block is divided into seek time, rotation latency, and transfer time. As shown in FIG. 7, the transfer time includes some head switch times and/or track-to-track seek times. It should be noted that seek times, rotational delays and transfer times may be random and not known a priori.

Note that to get the total time required to get the data transferred into the system's memory, one should also account for any additional time that may be incurred in contending for the SCSI bus, in transferring the data from the controller's buffer to the system's memory. However, as these operations take place to a large degree simultaneously with the transfer of data off the disk into the controller's memory, such additional delay is negligible and may be ignored.

The most important requirement on the storage system in supporting an active stream is to maintain the continuity of the stream. In the case of playback, data must be retrieved from the disk and made available to the consumer (e.g., a decoder) no later than the time at which it is needed so as to avoid letting the decoder underflow. Similarly, when a stream is getting recorded, the writing of data on the disk must keep up with the rate at which it is getting produced so as to avoid letting the buffer (e.g., the buffer 30 of FIG. 4B) overflow and thus losing data. Thus, to maintain continuity, every I/O operation must be completed within some stringent time constraint.

In view of the foregoing, it is an object of the present invention to provide a method for performing I/O transactions in a disk storage system so that the continuity of a plurality of streams is simultaneously maintained.

SUMMARY OF THE INVENTION

The present invention is directed to a method for operating a disk storage system comprising one or more disks. The disk storage system is operated so as to simultaneously maintain the continuity of a plurality of data streams. Typically, the streams transport video data to or from the disk storage system. The disk storage system may be located in a network such as a local area network and maintain the continuity of a plurality of streams in the network. Alternatively, the disk storage system may be part of a stand-alone system in which a plurality of video streams are retrieved from storage and displayed locally on a monitor, or received from an external source and locally stored in the disk storage system. Thus, the invention is described below in connection with a network such as a LAN, but it should be understood that the inventive method for operating a disk storage system is not restricted to use in such a network.

In accordance with the invention, I/O transactions take place in I/O cycles. For streams produced by the disk storage system, the data is consumed by the network in consumption cycles which follow one another without gaps. For streams produced by the network, the data is produced in production cycles which follow one another without gaps.

In an illustrative embodiment of the invention, the disk storage system comprises one disk. Each data stream is either produced by the network (e.g., produced by a video coder in the network) at a constant basic rate of $W_{base}$ bits per second and consumed by the disk, or produced by the disk and consumed by the network (e.g., consumed by a video decoder in the network) at a constant basic rate of $W_{base}$ bits/sec. One I/O transaction is performed for each stream in each of a plurality of successive I/O cycles of duration $S/W_{base}=T_{play}$. In each I/O transaction, a segment of S bits is stored in or retrieved from the disk. Illustratively, $W_{base}=1.2$ Mbits/sec and S=40 Kbytes. It should be noted that $T_{I/O}$, the total time for each I/O transaction ($T_{I/O}=X_{seek}+X_{ro}+X_{trans}$), is much shorter than $T_{play}$ which is the time it takes the network to produce or consume a segment of S bits of a stream.

The number of streams whose continuity can be simultaneously maintained is limited by the number of I/O transactions which can be performed in an I/O cycle of duration $T_{play}$. This depends on the locations of the retrieved and stored segments in the disk (as $T_{I/O}$ for each transaction depends on the location) as well as the order in which the I/O transactions are scheduled.

In accordance with the present invention, two modes of operations can be considered. The first mode of operation, known as the synchronous mode, operates as follows. The I/O transactions for the active streams are scheduled in a particular predetermined order in each I/O cycle, but the production or consumption cycles of duration $T_{play}$ in which the data segments of the active streams are produced or consumed by the network are not necessarily aligned with each other. The start of consumption or production cycles for each stream are delayed or advanced appropriately to maintain continuity over the lifetime of each stream. The later the start of the first consumption cycle or the earlier the start of the first production cycle for each stream, beyond the minimum necessary, the larger is the buffer requirements.

Consider a stream i produced by the disk and consumed by the network. The first I/O transaction for the stream i takes place in an I/O cycle at time $\tau_i$. Consumption of the fetched segment of size S bits takes place in a consumption cycle of duration $S/W_{base}$ which begins after $\tau_i$. The time after $\tau_i$ at which the first consumption cycle for the stream i begins is determined so that all the other streams complete their I/O transactions and stream i completes its second transaction before the end of the first consumption cycle of the stream i, as the second consumption cycle for stream i must begin immediately after the first consumption cycle or the stream i will not be continuous. Similarly, each of the other streams must complete their next I/O transactions and stream i must complete its third I/O transaction before the end of the second consumption cycle for stream i. This same condition holds for each succeeding cycle for which the stream i is active. The reason for this condition is that the I/O transactions of the streams take place in a non-varying predetermined order. Now consider the case of a stream j produced by the network. The first production cycle for the stream j produced in the network is timed to end so that an I/O transaction for the stream j and an I/O transaction for all other streams can take place before the end of the second production cycle for the stream j which immediately follows the first production cycle. Then, to maintain the continuity of the stream j, before the end of each succeeding production cycle of the stream j, one I/O transaction is performed for the stream j and one I/O transaction is performed for each of the other active streams.

The second mode of operation is known as gated operation. In the gated operation, the order of I/O transactions for the active streams may vary from one I/O cycle to the next. In order to be able to let the order of I/O's to vary from cycle to cycle, it is important not to allow the consumption of segments fetched in a given I/O cycle to take place earlier than the end of the given I/O cycle or to allow the production of segments to be stored in a given I/O cycle to take place later than the beginning of the given I/O cycle. If consumed (produced) at the earliest (latest) time, then the consumption (production) cycle for a segment fetched (stored) in a given I/O cycle for a given stream would coincide with the following (preceding) I/O cycle. If this is the case for all streams, then the consumption and production cycles for all streams are aligned with each other, as well as with the I/O cycles. But it is also possible to delay the consumption of a segment fetched for a given stream in a given I/O cycle beyond the start of the next I/O cycle, and for this delay to be different from stream to stream. Similarly, it is possible for the production of a segment to be stored in a given I/O cycle to be advanced so that it ends before the start of the given I/O cycle and for this advance to be different from stream to stream. In this case, however, the buffer requirement is larger.

One way of implementing a gated operation is as follows: a sequence of cycles of duration $T_{play}$ is defined, i.e., $T^1_{play}$, $T^2_{play}$, ... In each cycle $T^i_{play}$, each stream has one I/O transaction. In addition, in each cycle $T^i_{play}$, for each stream, one data segment S is consumed or produced by the network. Segments which are consumed by the disk in cycle $T^i_{play}$ are produced by the network in cycle $T^{i-1}_{play}$. Segments which are produced by the disk in cycle $T^i_{play}$ are consumed by the network in cycle $T^{i+1}_{play}$.

The advantage of this technique is that the order of the I/O transactions may vary from cycle to cycle. For example, the I/O transactions to be performed in a cycle may be sorted according to their locations on the disk so as to minimize the total I/O overhead.

To achieve a performance which is not dependent on the particular selection of files being played back or recorded (as pertaining to the location of the files on the disk), the locations of the segments belonging to each file can be randomized over the entire disk. The advantage of this is that the total I/O time ($T_{I/O}$) for any segments fetched in a cycle of duration $T_{play}$ is a random variable which is independent of the I/O time of all other segments to be fetched in the same, as well as in other, I/O cycles of duration $T_{play}$. As a result, the sum of the I/O times for all segments is the sum of independently and identically distributed random variables.

Alternatively, the most popular files could be recorded on the outer zones of the disk, and the least popular files could be recorded in the inner zones, as the average I/O time is smaller for segments in the outer zones than the inner zones.

In the case where some streams have a bit rate different from the base bandwidth $W_{base}$, then zero, one, or more than one I/O transactions may be performed for that stream in particular I/O cycles of duration $T_{play}$. For example, if a stream has a bit rate of 2 $W_{base}$, two I/O transactions will be performed in each I/O cycle of duration $T_{play}$. If a stream has a bit rate of 1.5 $W_{base}$, the I/O transactions are alternated between one transaction in each I/O cycle of duration $T_{play}$ and two transactions in each I/O cycle of duration $T_{play}$. If a stream has a bit rate 0.5 $W_{base}$, then there is one I/O transaction in alternate cycles. In general, for a stream having a bit rate which is $(A/B)W_{base}$, where A and B are integers determined separately for each stream, A I/O transactions are performed within B I/O cycles of duration $T_{play}$. In some cases, B is set to a fixed value $N_{super}$ for all streams.

The present invention is also applicable to a disk array comprising $N_d$ disks. In this case, when all the streams have a bandwidth $(A/B)W_{base}$, the I/O cycle has a duration of $N_d S/W_{base}$ and there are A I/O transactions for each stream for each disk within B I/O cycles.

It should be noted that requests to service a new stream are accepted or rejected depending on the capacity of the disk storage system and the current load. Once a request to service a new stream has been accepted, the bandwidth needed for it has been reserved. This way, the storage system can maintain the continuity of the streams which are accepted. This principle holds for the case of uniform data rates and multiple data rates and the case of a single disk or multiple disks. In the case of multiple data rates, the number of I/O's scheduled in any cycle should not exceed the maximum number of I/O's that can be performed in a cycle.

BRIEF DESCRIPTION OF THE DRAWINGS

FIG. 2 and FIG. 3 illustrate the production and consumption of data by a disk storage system in the local area network of FIG. 1.

FIG. 4B illustrates one disk drive in the storage system of FIG. 4A.

FIG. 12 shows I/O, production and consumption cycles for G groups of streams having production and consumption cycles offset from one another.

DETAILED DESCRIPTION OF THE INVENTION

Figure 8:
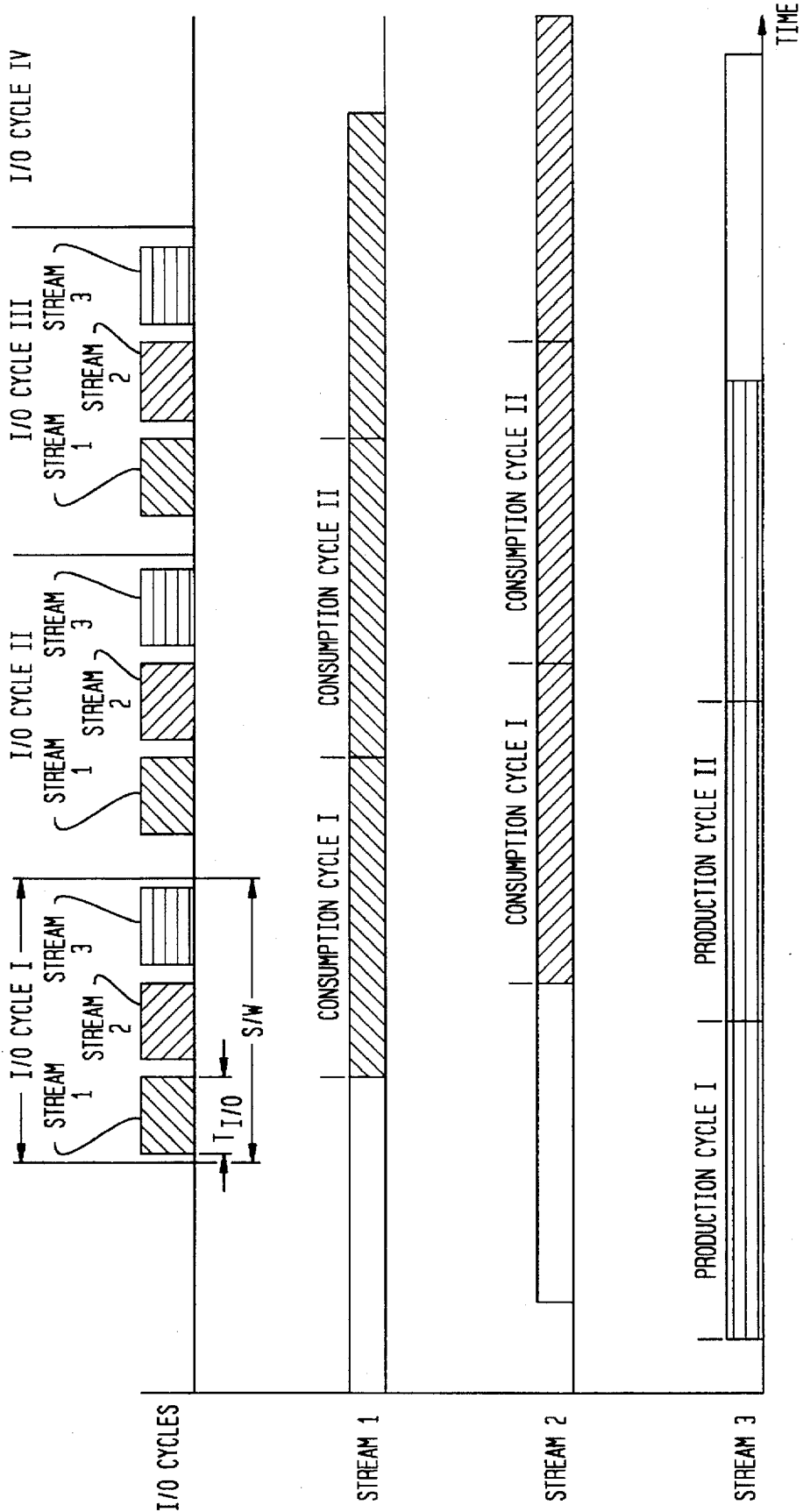
FIG. 8 shows how the continuity of a plurality of streams is maintained simultaneously in accordance with the synchronous mode of the present invention.
Figure 9:
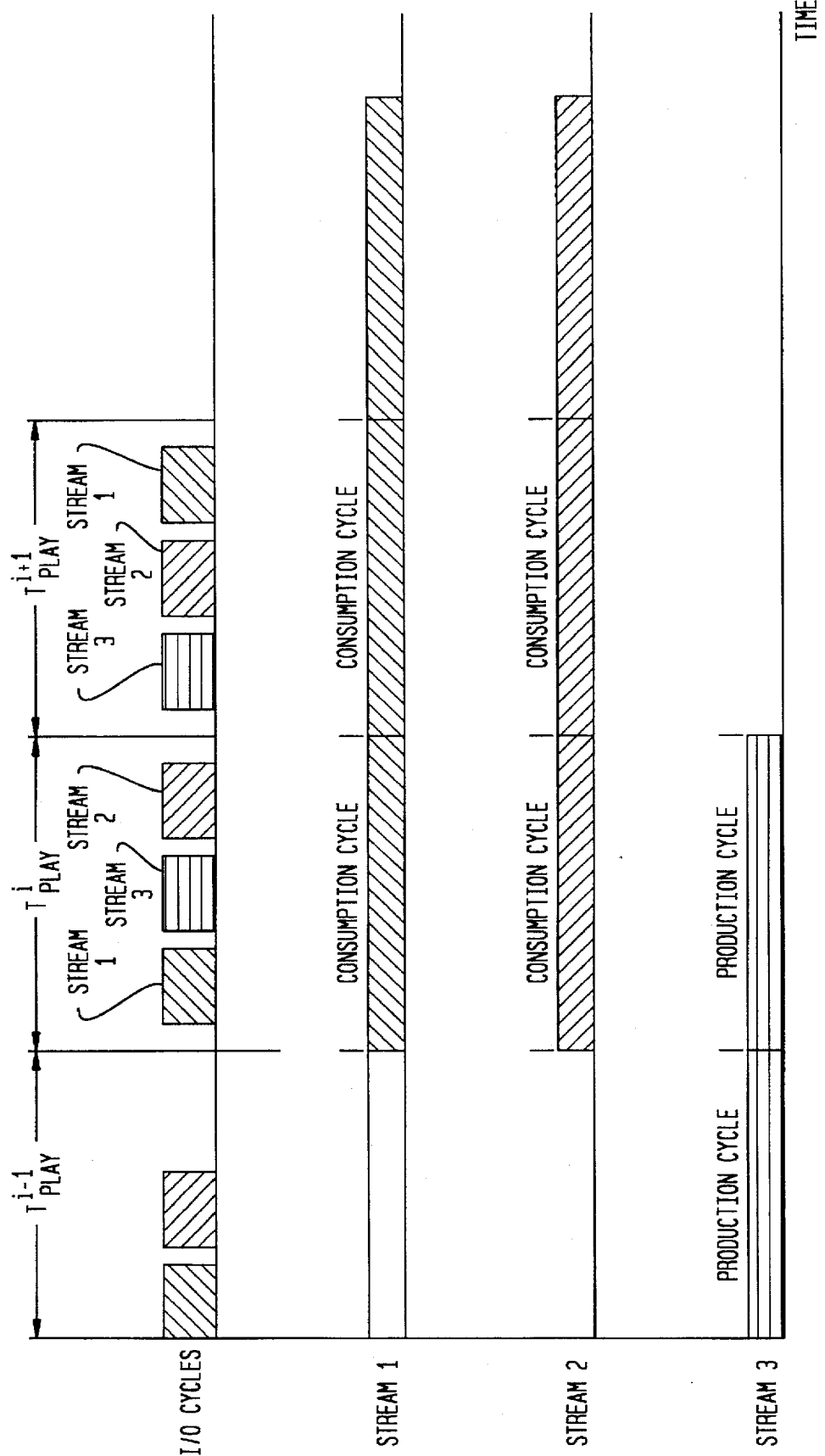
FIG. 9 shows how the continuity of a plurality of streams is maintained simultaneously in accordance with the gating mode of the present invention.

FIG. 8 shows how a disk storage system comprising one disk operates in accordance with the synchronous mode of the present invention. The case of three streams is considered, wherein the streams are labeled Stream 1, Stream 2, and Stream 3. Stream 1 and Stream 2 are produced by the disk and consumed by the network at a rate of $W_{base}$ bits/second. Stream 3 is produced by the network and consumed by the disk at the rate of $W_{base}$ bits per second.

The streams 1 and 2 are divided into consumption cycles. In each consumption cycle of duration $T_{play}=S/W_{base}$, one segment of S bits is consumed by the network at the rate of $W_{base}$ bits/sec. The Stream 3 is divided into production cycles of duration $T_{play}=S/W_{base}$. In each production cycle, one segment of S bits is produced by the network at a rate of $W_{base}$ bits/sec. Note that the consumption and production cycles for the Streams 1, 2, 3 are not aligned in time.

I/O transactions take place in I/O cycles. Each I/O cycle has a duration of $T_{play}=S/W$. In each I/O cycle, there is one I/O transaction for each stream, wherein a segment of S bits is retrieved from or written into the disk. In each I/O cycle, the I/O transactions for the streams take place in a predetermined order, i.e., Stream 1, Stream, 2, Stream 3. Each I/O transaction has a duration $T_{I/O}$ and the maximum number of streams for which continuity is maintained is determined by the number of I/O transactions which can be accommodated in an I/O cycle of duration S/W. The number of I/O transactions which can be accommodated in one I/O cycle of duration $S/W_{base}$ is not easily determined due to the fact that I/O is random or a priori unknown. Thus the number of transactions in an I/O cycle is determined probabilistically (e.g., the probability that a certain number of transactions exceeds the cycle length is equal to $10^{-6}$).

Note that the I/O transactions are scheduled in the I/O cycles to maintain the continuity of the streams. Thus a segment produced by the disk in an I/O transaction in an I/O cycle is consumed by the network in a later starting consumption cycle for the particular stream. Similarly, a segment consumed by the disk in an I/O transaction in an I/O cycle is produced by the network in an earlier ending production cycle.

For streams 1, 2, and 3, once the playback or recording has started, the consumption or production cycles are all of the same duration (S/W) and are back-to-back with no interruptions (that is the idea behind continuity). Now the constraint on the disk scheduling problem is to get or store the next or previous segment prior to the completion of the current consumption or production cycle. It is always possible to start the first consumption or production cycle immediately following the end of or before the start of the first I/O transaction; once this is started, then the next deadline for performing the next I/O is $S/W_{base}$ sec from that time, and the one after is $2S/W_{base}$ after, and so on. Furthermore, it is possible to start the first consumption cycle or complete the first production cycle, respectively, a certain time after or a certain time before the completion or start of the first I/O transaction. The bigger the delay or advance, the later (and thus more relaxed) is the deadline for future I/O transactions.

For example, as shown in FIG. 8, in I/O cycle I, a segment is produced by the disk for stream 1 which is consumed by the network in consumption cycle I which starts after this I/O transaction. Similarly, in I/O cycle II, a segment is produced by the disk for stream 1 which is consumed by the network in consumption cycle II which starts after this I/O transaction is complete. With respect to Stream 2, a segment is produced by the disk in I/O cycle I that is consumed by the network in a consumption cycle I which starts after this I/O transaction. Similarly, a segment is produced for the Stream 2 by the disk in I/O cycle II which is consumed by the network in consumption cycle II. For stream 3, a segment produced by the network in production cycle I is stored in the disk in I/O cycle I, a segment produced by the network in production cycle II is stored in the disk in I/O cycle II, etc. Note that in each case for stream 1 or 2, the next I/O transaction must take place before the start of the consumption cycle for that stream wherein the fetched data is to be consumed. The greater the delay between an I/O transaction and a consumption cycle in which the data is consumed, the greater are the buffer requirements. Note that a production cycle must end before the start of the I/O transaction in which the produced segment will be stored. The greater the delay between the end of a production cycle and the start of the corresponding I/O transaction, the greater is the buffering requirement.

Figure 10:
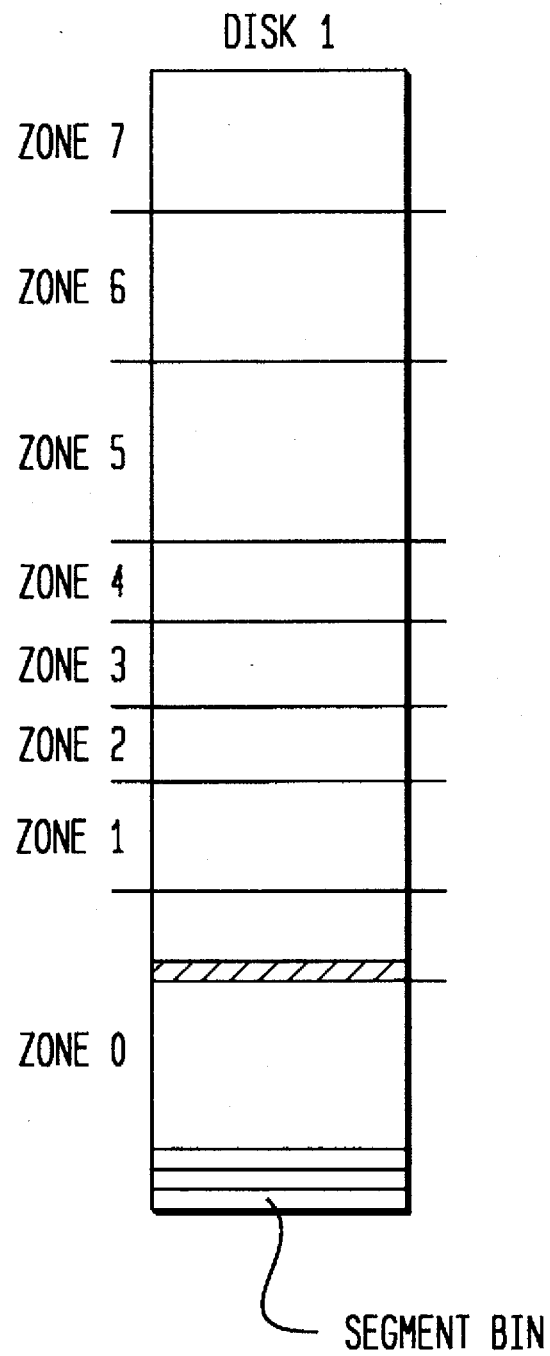
FIG. 10 shows how data segments are located in a disk.

FIG. 10 illustrates the operation of the disk storage system in the gated mode according to the present invention. Again there are three streams, Stream 1, Stream 2, Stream 3. Streams 1 and 2 are produced by the disk. Segments of S bits are consumed by the network at a bit rate of $W_{base}$ bits/sec in consumption cycles of duration $T_{play}=S/W_{base}$. Stream 3 is produced by the network in segments of S bits at a bit rate of $W_{base}$ bits/sec in production cycles of duration $T_{play}=S/W_{base}$. I/O transactions take place in I/O cycles of duration S/W.

In the gated mode, illustrated in FIG. 10, the I/O cycles and the production and consumption cycles are time aligned. These aligned cycles are labeled $T^{i-1}_{play}, T^{i}_{play}, T^{i+1}_{play}$, etc. A segment of Stream 3 produced by the network in cycle $T^{i-1}_{play}$ is stored in the disk in an I/O transaction which takes place in cycle $T^{i}_{play}$, and a segment produced by the network in cycle $T^{i}_{play}$ is stored in the disk in an I/O transaction which takes place in cycle $T^{i+1}_{play}$. Similarly, a segment of Stream 1 or Stream 2 which is produced by the disk in an I/O transaction in cycle $T^{i}_{play}$ is consumed by the network in cycle $T^{i+1}_{play}$ and a segment which is produced by the disk in an I/O transaction in cycle $T^{i+1}_{play}$ is consumed by the network in cycle $T^{i+2}_{play}$.

Note that the order of the I/O transactions may vary from one I/O cycle to another. For example, in cycle $T^{i}_{play}$ the order is Stream 1, Stream 3, Stream 2 and in cycle $T^{i+1}_{play}$ the order is Stream 3, Stream 2, Stream 1. The schedule of I/O transactions within a cycle time should be ordered to minimize total overhead, i.e., the sum of $T_{I/O}$ for all active streams, so as to maximize the number of streams for which continuity can be simultaneously maintained. Thus, I/O's within an I/O cycle should be scheduled in accordance with their location on a disk. One way to schedule I/O's is to move the heads from the outer cylinder to the inner cylinder in one cycle and then from the inner cylinder to the outer cylinder in the alternate cycle.

Note that in the gated mode as illustrated in FIG. 10, the requirement for continuity is maintained. The consumption or production cycles of streams 1, 2 and 3 are back-to-back with no interruptions (the idea behind continuity). For each of the streams the next or previous segment is retrieved or stored prior to the completion of the current consumption or production cycle.

If the segments of a stream file are placed in particular locations, then the assessment as to whether a new stream maybe accepted or rejected will require knowledge of the locations of all the segments that may be required in the lifetime of the stream, since the location of a segment affects the transfer time of that segment, and hence the number of I/O transactions that can be performed in a cycle. This argument is also valid when the segments of the various files are located in contiguous locations. To achieve a performance which is not dependent on the particular selection of files being played back or being recorded (as pertaining to their locations on the disk) and to achieve a performance which is consistent over all scenarios, the location of segments belonging to each file may illustratively be randomized over the entire disk. As shown in FIG. 10, consider the disk to be divided into segment length bins. Data segments for each file are allocated to the segment bins on a random basis. The advantage of this arrangement is that the transfer time for any segment fetched in an I/O cycle is a random variable which is distributed over the entire range, and is independent of the transfer times of all other segments in the same as well as in other I/O cycles (unless, of course, multiple streams are playing back the same file and are time-synchronized with each other such that in each cycle they are all fetching the same segment, in which case it is sufficient to fetch a single copy.) As a result, the sum of transfer times for all segments being fetched in a cycle is the sum of independently and identically distributed random variables, and is independent of such sums in all other cycles. Furthermore, by the law of large numbers, as the number of segment fetched per cycle increases, the variance of the sum of transfer time decreases.

Alternatively, the most popular files could be recorded in the outer zones of the disk and the least popular files could be recorded in the inner zones of the disk.

It should also be noted that not all disks are zoned. When all tracks contain the same number of sectors, all segments transfer times are equal, there is no need for randomization and all segments of a file may be stored contiguously.

Figure 11:
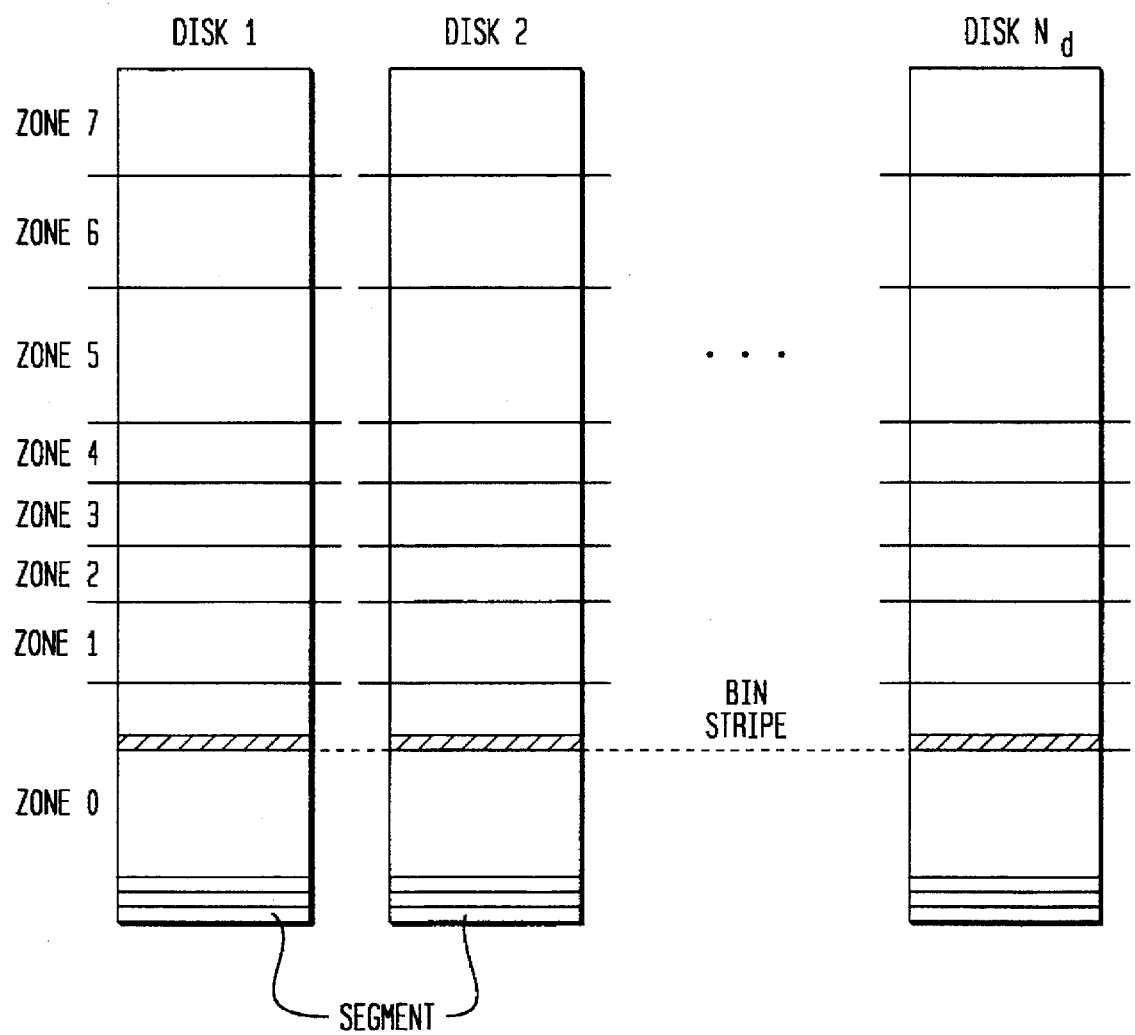
FIG. 11 shows how data segments are located in a disk array of $N_d$ disks.

In order to increase the number of streams beyond that which is possible with a single disk, an array of multiple disks may be utilized. The number of disks in the array may be designated by $N_d$. All of the disks in the array are operated in the manner described above. In order to achieve good performance, it is desirable to insure that all $N_d$ disks have the same load, i.e., in each I/O cycle, there are an equal number of I/O transactions for each disk. One simple way to accomplish this is to consider the segments of S bits in a file to be grouped into data stripes of $N_d$ consecutive segments each. It is also useful to consider the segment bins in corresponding locations on each of the $N_d$ disks to form bin stripes of $N_d$ bin segments each. The bin stripes for $N_d$ disks are illustrated in FIG. 11. The data stripes for a particular file are allocated randomly to the bin stripes.

The striping of the data on the disk need not be horizontal, although the most natural case to consider is the horizontal striping. (FIG. 11 indicates the striping to be horizontal.) What is most desirable however is the fact that the allocation of segments to the disks should be according to a regular cyclic pattern, i.e., consecutive segments should be placed in order on disk 1 then 2 then 3, . . . until $N_d$ then 1, 2, etc. This way, regardless of where in its file each stream starts, the load on all disks is balanced; indeed, in each cycle and for each stream, a stripe worth of segments is fetched, and all segments in that stripe are guaranteed to be on different disks.

When $N_d$ disks are used to serve a plurality of streams, each of which is produced or consumed by the network in segments of S bits and at a bit rate of $W_{base}$ bits/sec, the I/O cycle length is now $N_dS/W_{base}=N_dT_{play}$. In each I/O cycle, $N_d$ segments are retrieved or recorded for each stream, one segment from each disk, thus guaranteeing that all disks are accessed equally. The number of streams where continuity can be simultaneously maintained is determined by the number of I/O transactions which can be performed on a disk in an I/O cycle of duration $N_dT_{play}$.

In addition, it should be noted that the $N_d$ segments fetched for a stream in an I/O cycle could come from one (e.g., horizontally) stripe or adjacent portions of two chronologically consecutive stripes. This permits a stream to stop and resume anywhere and not be restricted to stopping at stripe boundaries without jeopardizing the uniform loading of the disk.

The inventive method for operating a disk storage cycle is applicable to a conventional RAID (Redundant Array of Inexpensive Disks).

Assume the maximum number of allowed streams is $N_{al}$. Then, the maximum number of I/O transactions to be performed in a cycle time $N_dS/W_{base}$ is $N_{al}N_d$, i.e,. each of the $N_{al}$ streams has one transaction in each of $N_d$ disks.

There are a number of ways in which this number of I/O transactions can be scheduled within each I/O cycle. Consider the gated operation described above, wherein the consumption and production cycles of all streams are time aligned. If the segment buffers used for a stream in the buffer 30 are separate from those for other streams, then each stream needs $2N_d$ segment buffers. This can be understood as follows. There is no a priori order in which the I/O's are carried out and it is possible for all $N_d$ I/O transactions for a given stream to take place at one time. At the beginning of every I/O cycle, each stream has $N_d$ segments produced by the disk storage system during the previous cycle and waiting to be consumed by the network or $N_d$ segments produced by the network in the previous cycle and waiting to be consumed by the disk storage system. In the case of a stream produced by the disk storage system and consumed by the network, it is not known when during the cycle (e.g., beginning or end) the next $N_d$ segment will be produced by the disk storage system. Similarly, in the case of a stream produced by the network and consumed by the disk, it is not known when during the cycle the $N_d$ segments will be consumed by the disk, but it is known with certainty that by the end of the cycle an additional $N_d$ segments will be produced by the network. Thus, in either type of stream, to be sure no segments are lost, $2N_d$ segment buffers are required for each stream.

With buffer sharing among the streams, the number of segment buffers required for all streams can be substantially reduced.

An alternate scheduling technique, involves dividing the streams into G groups. The size of each group may be for example $N_{al}/G$. The consumption and production cycles of the streams in each group are time aligned with each other, but the consumption and production cycles of each successive group are offset by one $(1/G)^{th}$ of an I/O cycle of duration $N_dS/W_{base}$. FIG. 12 shows the production and consumption cycles for G=8 groups of streams, for the case $N_d$=4 disks.

As shown in FIG. 12, the I/O cycle is divided into G subcycles. In each subcycle of length $N_dS/W_{base}G$, the I/O transactions are performed for the group of streams whose production/consumption cycles begin at the end of the particular I/O subcycle. The group of I/O transactions performed in each subcycle is sorted separately, for example, alternating between increasing and decreasing order of cylinders so as to minimize seek overhead. As $N_d$=4, the number of I/O transactions for a stream served in each subcycle is four. For example, as shown in FIG. 12, for a stream in Group 2, which is served in I/O subcycle #2, there is one segment retrieved from each of the four disks. It should be noted that G can be larger than or smaller than $N_d$. This scheduling technique also reduces the amount of buffers utilized. It should also be noted that in the operation described above, all disks experience the same load.

In yet another technique for scheduling I/O transactions in each I/O cycle of duration $N_d S/W_{base}$, the streams are again divided into G groups and the size of each group is again, for example, $N_d/G$. I/O transactions are performed in subcycles of length $N_d S/W_{base} G$, however, instead of retrieving or storing $N_d$ segments for each stream in an entire group of size $N_d/G$, there is retrieved or stored one segment for each stream in $N_d$ groups. The segments retrieved or stored are those which begin consumption immediately following the subcycle or which were produced immediately preceding the subcycle. This scheduling technique also leads to reduced buffer size requirements. In order to keep the load on all disks balanced during each I/O subcycle, it is desirable to guarantee that the segments to be retrieved or stored for each of the $N_d$ groups served in a subcycle come from separate disks. This imposed structure on the order in which segments are fetched for various streams from the various disks has implications on the initial delay incurred by new streams joining the system, and places limitations on the ability to vary the disk access pattern for streams.

Consideration is now given to how the disk storage system is able to support streams with different production/consumption rates. While dividing the I/O cycle into subcycles can lower buffer requirements, grouping multiple consecutive I/O cycles into a supercycle can accommodate streams with diverse bandwidth requirements. Consider a disk storage system consisting of $N_d$ disks which can support $N_{al}$ streams, each of nominal rate $W_{base}$ bits/sec. The basic scheduling algorithm of fetching one stripe per stream per I/O cycle of duration $N_d S/W_{base}$ is now modified to allow fetching multiple stripes per stream per supercycle where a supercycle comprises $N_{super}$ consecutive I/O cycles. The number of stripes to be fetched in a supercycle depends on the stream rates. This scheduling algorithm can support streams of different rates ranging from a minimum of $W_{base}/N_{super}$ bit/sec to a maximum of $N_{al} W_{base}$ bits/sec with increments of $W_{base}/N_{super}$ bits/sec. Streams that require rates that do not belong to the above denominations will be assigned a bandwidth of the next higher allowable rates, in which case certain I/O bandwidth is wasted. For example, let $N_{super}$=16, then a stream with rate $1.25 W_{base}$ bits/sec is allowed to fetch 20 stripes per supercycle, a stream with rate $0.125 W_{base}$ bits/sec is allowed to fetch 2 stripes per supercycle, and a stream with rate $0.3 W_{base}$ bits/sec is allowed to fetch 5 stripes per supercycle (although this stream may need to fetch fewer than 5 stripes in some supercycles).

To define the scheduling in more precise terms, let $C_i$ be the $i^{th}$ I/O cycle of a typical supercycle where i=1, 2, ..., $N_{super}$. For a particular stream, numbered j, $L_{ij}$ stripes are allowed to be fetched in the $i^{th}$ I/O cycle. Clearly, $L_{ij}$ must be an integer between 0 and $N_{al}$. To satisfy the disk I/O bandwidth constraint for $C_i$ within a supercycle, the sum of $L_{ij}$ over all j must not exceed $N_{al}$. To satisfy the continuity constraint for stream j, the sum of $L_{ij}$ over i=1, 2, ..., $N_{super}$ must be greater than or equal to the amount of data, normalized by the stripe size, produced/consumed by stream j in a supercycle. To minimize latency and buffer requirements, it is desirable, for each stream j, to minimize the variance among the set of numbers $\{L_{ij}\}$ as well as to minimize variance of the $$\sum_j L_{ij}$$

for all cycles i. The above criteria serve as the basis for admitting and scheduling the data retrieval of a stream.

The choice of $N_{super}$ depends on a number of considerations. A large value of $N_{super}$ provides fine resolution of the streams and hence efficient use of I/O bandwidth. However, it increases start-up latency as well as the complexity of the scheduler. Thus, $N_{super}$ must be carefully selected for the anticipated mixture of stream rates and tolerable start-up latency.

Another way to view the supporting of streams with different bit rates is as follows: Consider a disk storage system comprising $N_d (N_d \geq 1)$ disks. Each stream has a bit rate of $(A/B) W_{base}$ where A and B are integers chosen separately for each stream. The I/O cycles have a duration of $N_d S/W_{base}$. For each stream, within each B I/O cycle there are A I/O transactions for each of the $N_d$ disks. Preferably, for each stream, the A I/O transactions for each disk are equally spaced over the B I/O cycles as this balances the load across the disks. Illustratively, the value of B is set to $N_{super}$ for all streams. This makes it relatively simple to keep track of active streams and to solve the scheduling problem. In this case, B=$N_{super}$ I/O cycles is equal to one supercycle as described above.

Consideration is now given to how the disk storage system is able to serve new streams. Start-up latency is the time elapsed from a request to initiate a new stream until the stream may begin to consume or produce its data. Two factors contribute to this latency. First, a stream requires a certain amount of data to be made available before it is able to begin data consumption or production (this is referred to as the start-up data). Secondly, once the start-up data is available (e.g., is retrieved from memory), a stream has to wait for the beginning of its next cycle before it can begin consuming its start-up data; (Recall that in the gated mode of operation, all streams may have their cycles time-aligned). A stream is said to be in the start-up phase when its start-up data is being fetched.

Figure 1:
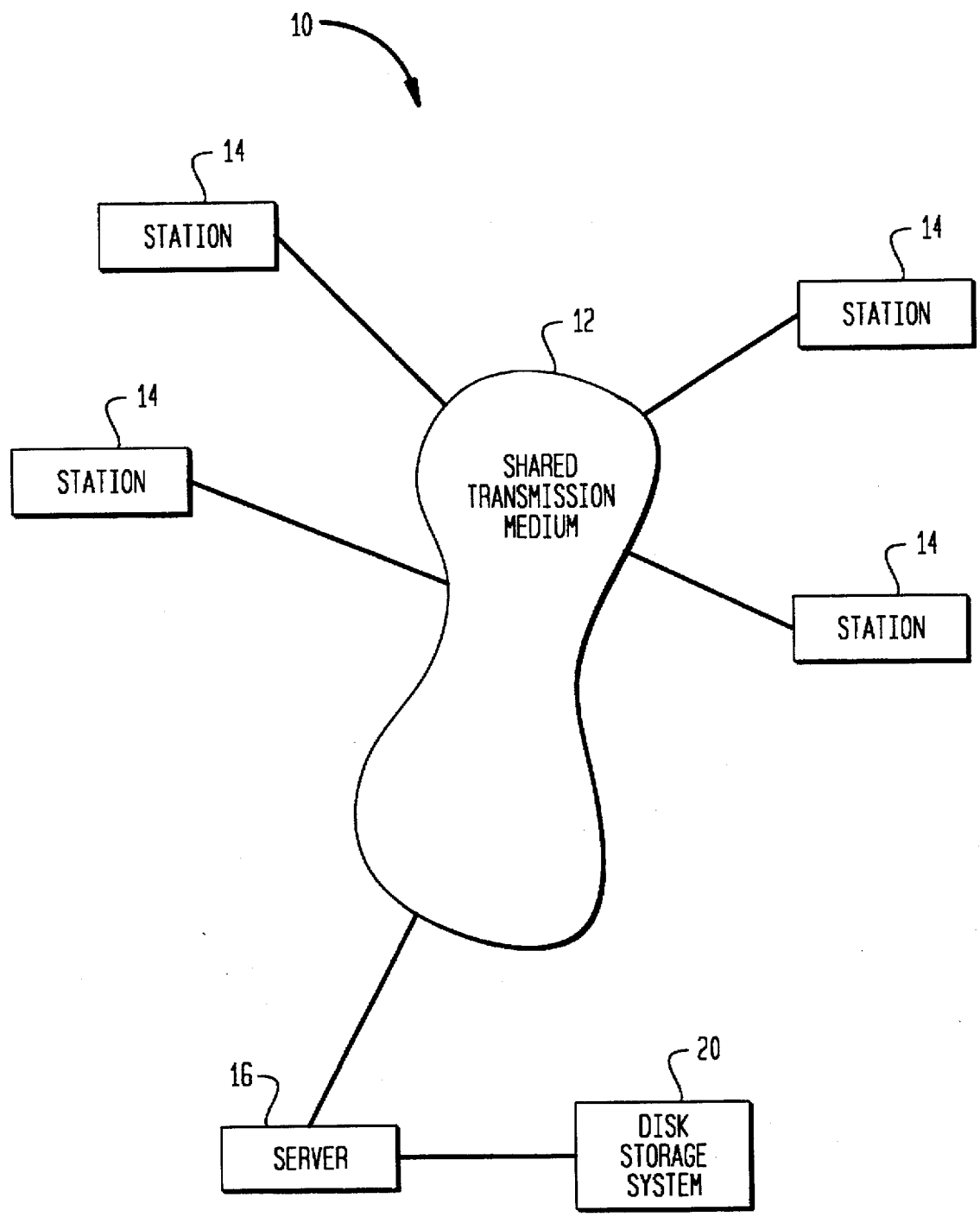
FIG. 1 schematically illustrates a local area network comprising a server, disk storage system, transmission medium and a plurality of end-user stations.
Figure 4A:
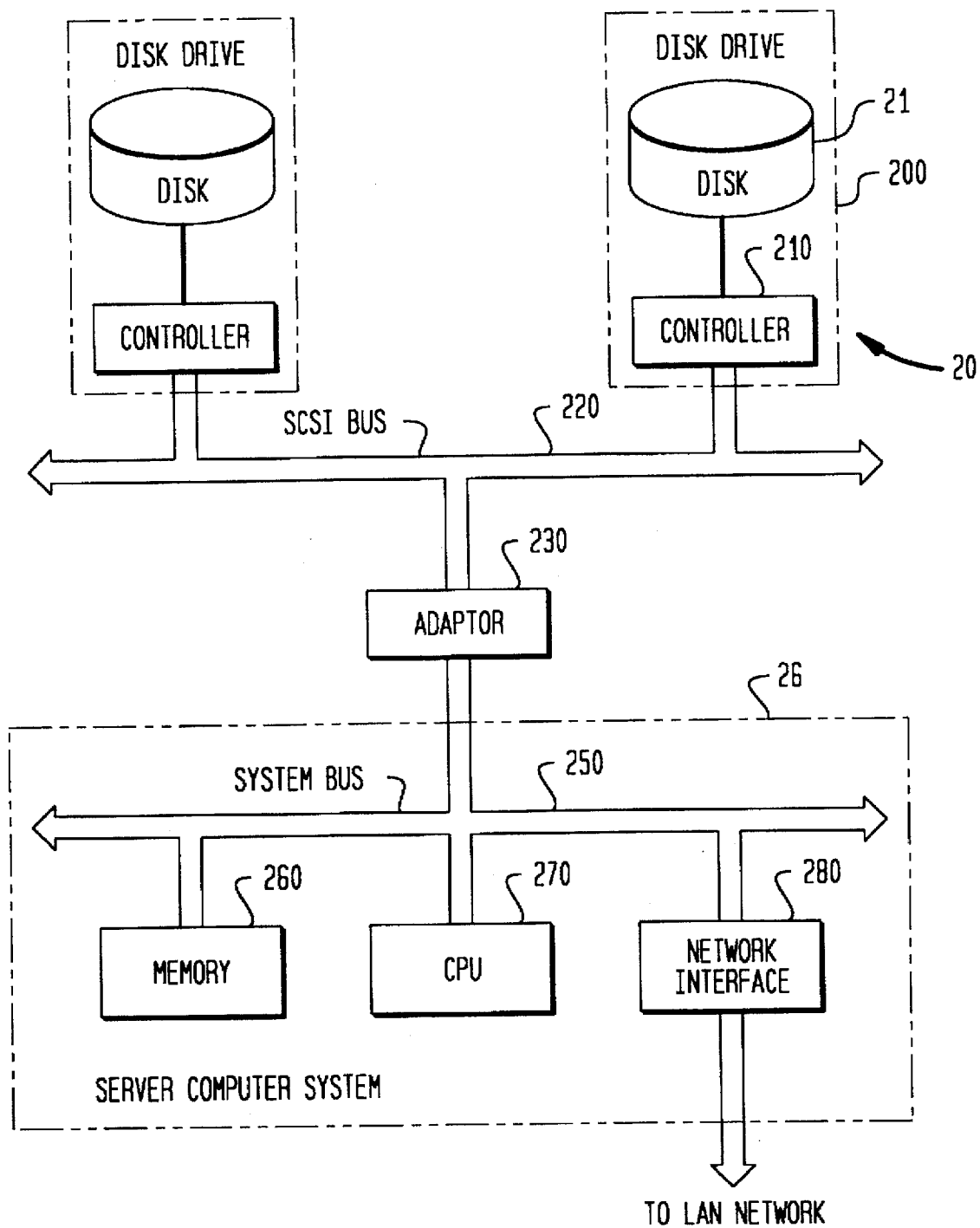
FIG. 4A illustrates a disk storage system.
Figure 5:
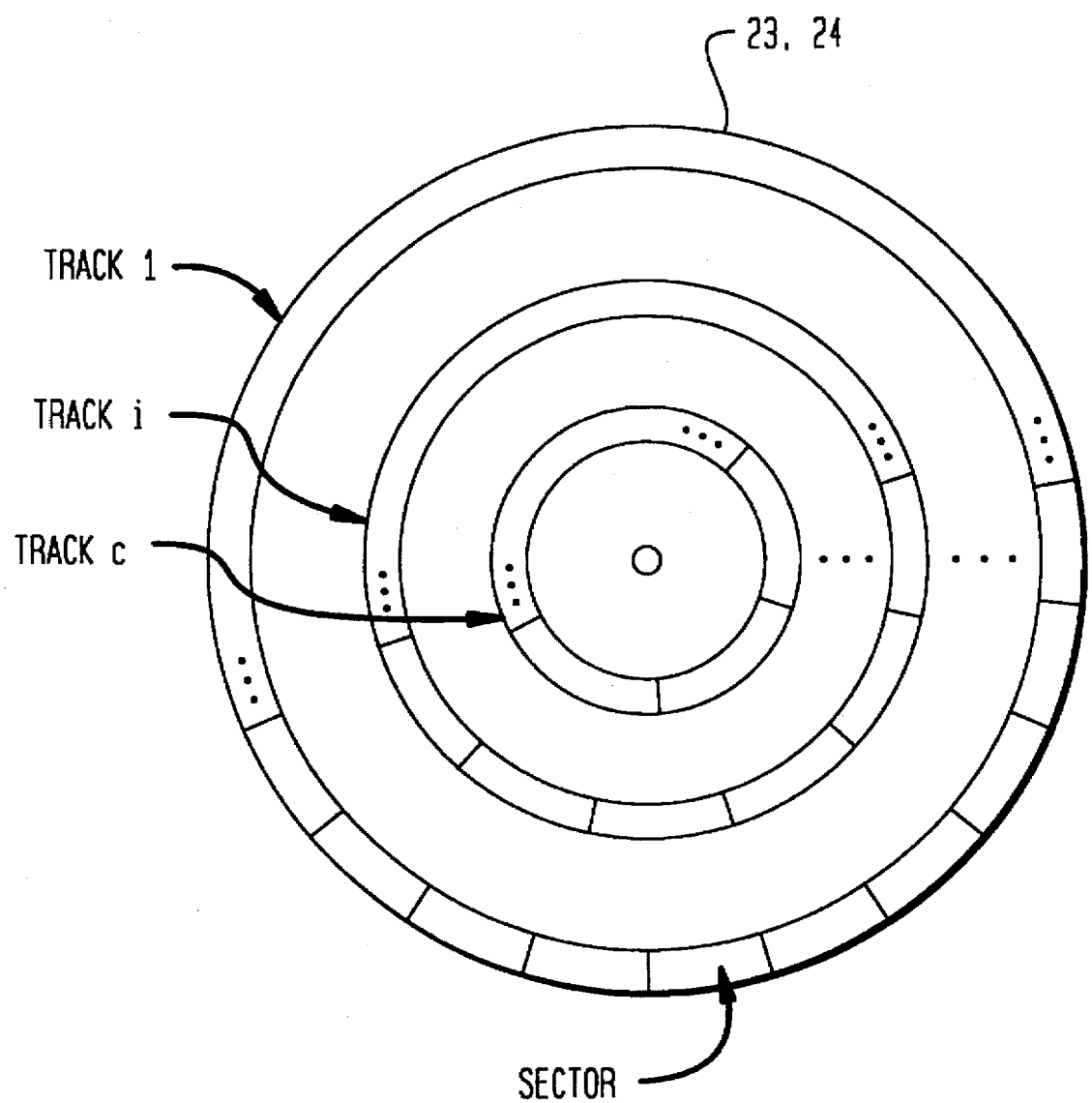
FIG. 5 illustrates the surface of a platter in the disk drive of FIG. 4B.
Figure 6:
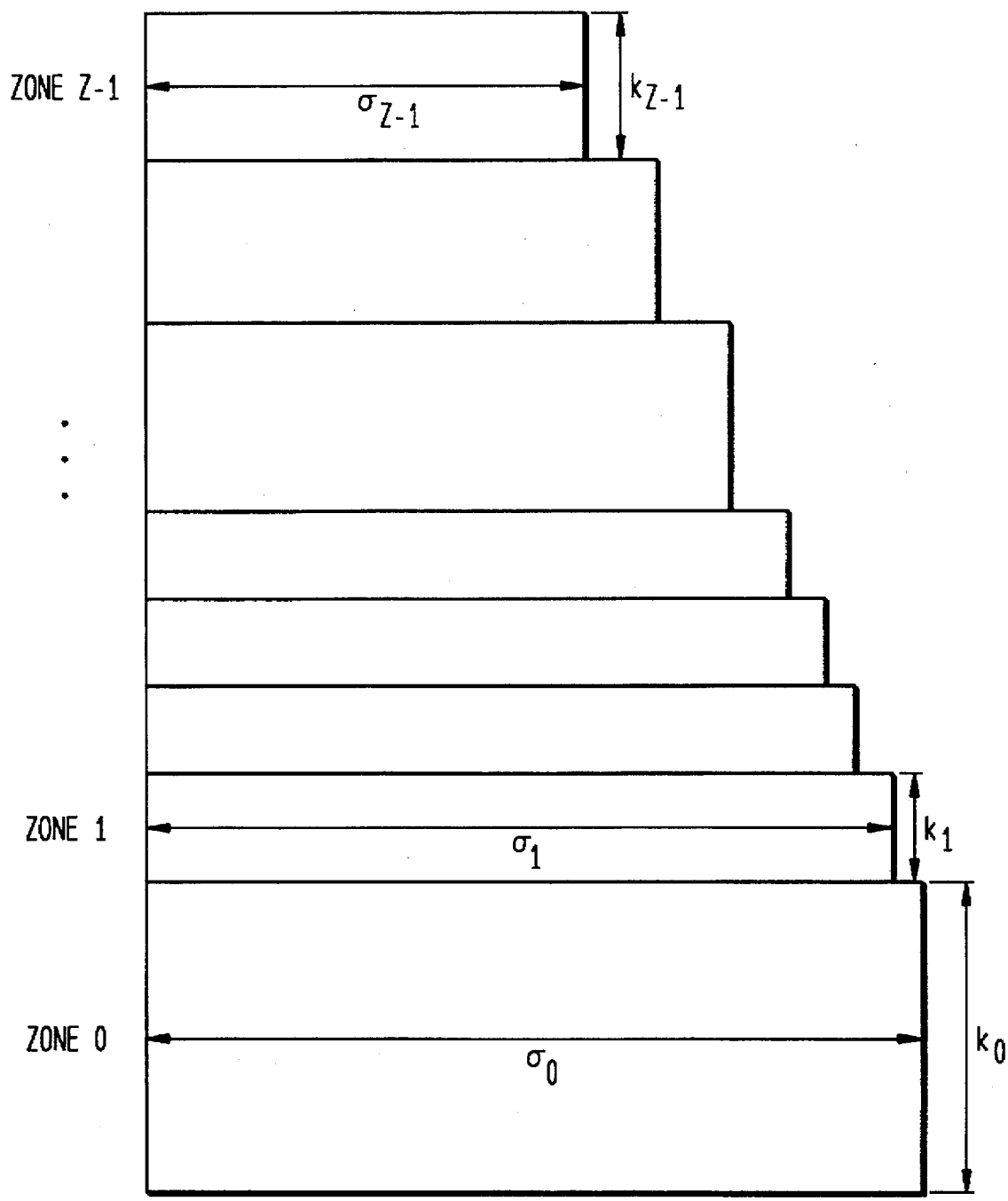
FIG. 6 illustrates how the surface of a platter is organized into zones.
Figure 7:
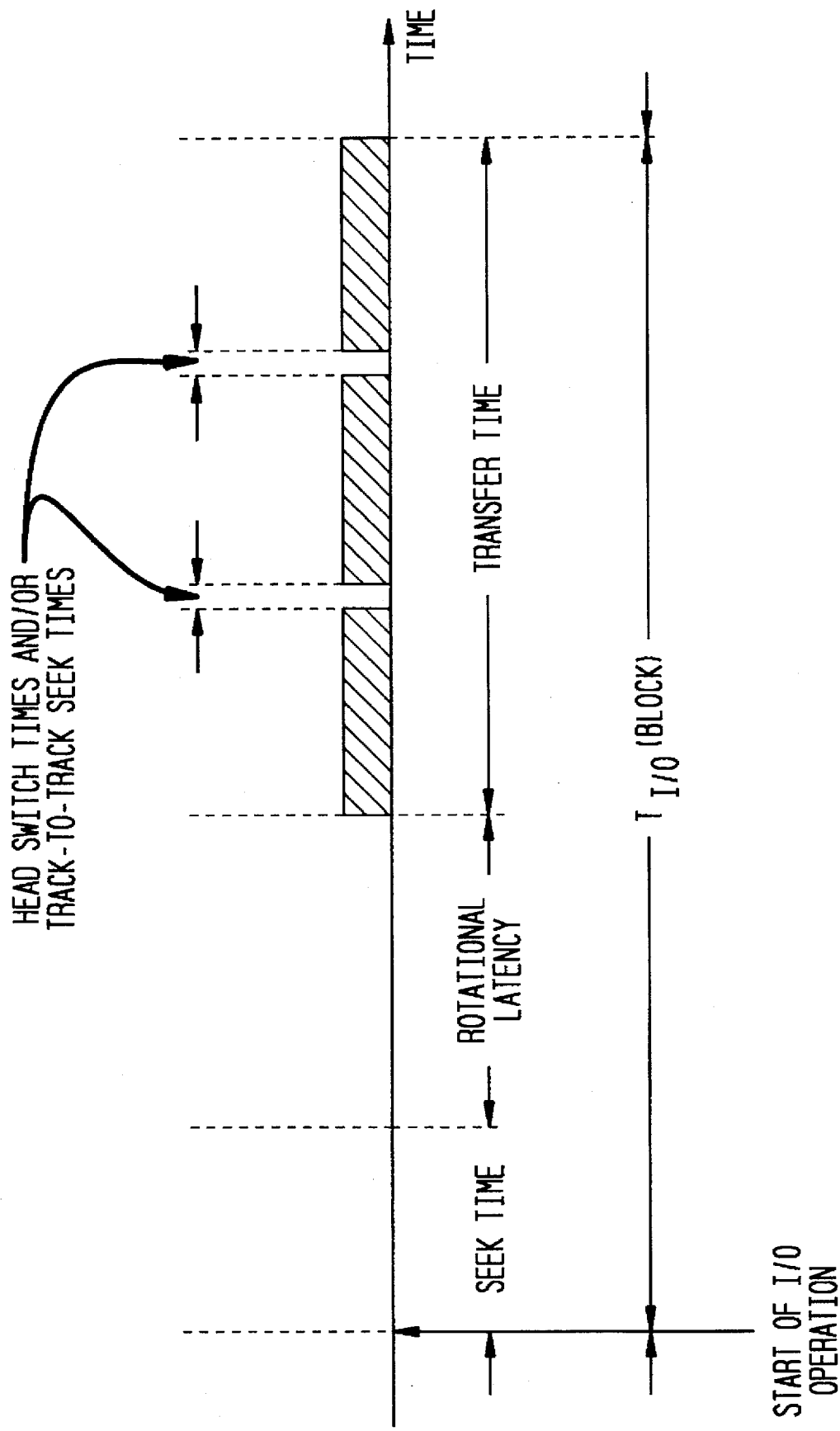
FIG. 7 illustrates the overhead time ($T_{I/O}$) for an I/O transaction in the disk storage system of FIGS. 4A and 4B.

Consider a disk storage system consisting of $N_d$ disks supporting streams of bandwidth $W_{base}$ bits/s, operating in the gated mode. As indicated above, the maximum number of streams $N_{max}$ that can be supported simultaneously is equal to the maximum number $M_{max}$ of I/O's that can be performed in one disk in a period of time equal to one I/O cycle of duration $N_d S/W_{base}$, where S is the segment size. When configuring a system, however, the maximum number of streams that may be allowed to be active simultaneously may be limited to some number, denoted by $N_{al}$ so that the number of I/O transactions allowed for one disk in an I/O cycle for transactions related to data streams is $M_{al}$. At any given time, the number of active streams is denoted $N_{active}$. This corresponds to $M_{active}$ I/O transactions related to streams for one disk in each I/O cycle. In general, $M_{max} > M_{al} \geq M_{active}$. The excess disk access capacity (i.e., $M_{max} - M_{active}$) is then used for I/O transactions to support storage management functions, and to prefetch start-up data more quickly (thus decreasing the start-up latency). $N_{al}$ is enforced by means of a call control processor which rejects a request for a new stream to become active if the number of currently active streams, $N_{active}$, is equal to $N_{al}$ (or if the number of I/O transactions for active streams in an I/O cycle $M_{active}$ is equal to $M_{al}$). Such a call control processor may be implemented in the server 16 of FIG. 1.

Consider the case $N_{active} < N_{al}$ or $(M_{active} < M_{al})$. The start-up latency incurred by a new stream is dependent on many factors; namely, the amount of start-up data needed for that stream;

the number of streams that are active at the time of request, as this directly affects the available disk access capacity at the time of arrival;

the number of streams which are in the start-up phase at the time of request, and the amount of residual start-up data for each, the number of other new streams which arrive during the start-up period of the new stream, and possibly the arrival process according to which these streams arrive, the service discipline according to which the new streams are served, the scheduling discipline according to which active stream I/O's and new stream I/O's are scheduled in a cycle.

There is now described some scenarios for the arrival of new streams, and examples of possible service disciplines and I/O scheduling disciplines.

Consider that there already are $N_{active}$ streams in the active state, and a certain number, $N_{new}$, of requests to initiate new streams, where $N_{new} \leq N_{al} - N_{active}$. The following two arrival scenarios are considered:

a) Uniform arrival process: The $N_{new}$ requests are uniformly distributed during a period of time equal to K cycles. The average rate at which the requests arrive is equal to $N_{new} W_{base}/KS$ arrivals/second.

b) Poisson arrival process: The $N_{new}$ requests arrive according to a Poisson process with a constant rate equal to $N_{new} W_{base}/KS$ arrivals/second.

Given a certain number of streams presently in their start-up phase, the service discipline defines the specific algorithm according to which the excess disk access capacity is allocated to these streams. Two such service disciplines are First-Come-First-Served and Round Robin. Other service disciplines can also be envisioned, such as Last-Come-First-Served with or without preemption, whereby the entire disk's excess capacity is entirely allocated to the new stream which arrived last, and Shortest-Job-First, again with or without preemption, whereby the entire disk's excess capacity is allocated to the stream with the smallest start-up data requirement.

The I/O scheduling discipline specifies the order within a cycle in which the I/O's for the active streams and the I/O's for the selected new streams in the start-up phase are performed. Two disciplines are considered:

a) Fully-Sorted Scheduling: At the beginning of each I/O cycle and for each disk, all $M_{active}$ segments needed for the active streams, and up to $M_{max} - M_{active}$ start-up segments, selected according to the service discipline in use, are fully-sorted and executed in that cycle. Should the total number of fully-sorted I/O's to be performed in a cycle be less than a predetermined maximum, then the remaining available disk access capacity can be used to serve any potential new start-up stream which may have arrived during the cycle. One way is to perform the scheduled fully-sorted I/O's first, and then serve the newly arrived streams in a subsequent sub-cycle, ensuring that the number of I/O's selected for service in the subsequent sub-cycle does not exceed the maximum number that can be performed in the remaining cycle time. The same arguments can then be applied recursively to create further sub-cycles, if the need arises. It should be clear that with multiple subcycles the total number of I/O's that can be performed in a cycle time is smaller than that which can be performed with a single fully-sorted cycle. Accordingly, it may prove advantageous to consider the following modification: as soon as knowledge of new segments to be fetched is acquired, those segments which lie ahead of the current position of the disk's head are selected and merged with the remaining portion of the originally sorted list.

b) Separate subcyles: The I/O's corresponding to the active streams are performed first, sorted among themselves; then in the remaining cycle time, as many start-up I/O's as possible are scheduled for streams in the start-up phase, these too sorted among themselves. Just as with the fully-sorted case, the creation of subsequent subcycles beyond the first to serve newly arriving streams may be used.

The method for serving new streams may be summarized as follows. The maximum number of I/O transactions for a disk in an I/O cycle of a particular duration is $M_{max}$. By this it is meant that the probability of $M_{max}$ I/O transactions not fitting within a particular I/O cycle is less than a predetermined small number such as $10^{-6}$. However, the number of I/O transactions for active streams may be limited to $M_{al}$ for each disk in an I/O cycle. The number of I/O transactions for active streams for each disk in an I/O cycle is $M_{active}$, where $M_{max} > M_{al} \geq M_{active}$. The excess capacity $M_{max} - M_{active}$ may be used for non-streaming data such as storage management functions, and to prefetch start-up data for new streams. If the number of $M_{active}$ I/O transactions for active streams for each disk in an I/O cycle is less than $M_{al}$, new streams may be activated. The new streams may be activated in a manner so that the number of I/O transactions in a disk for active streams does not exceed $M_{al}$ in an I/O cycle. New streams may be selected for activation from all waiting streams according to a discipline such as first-come, first-served or round robin. Once one or more new streams are selected for activation, the I/O transactions for the start-up data of the new streams are scheduled within each I/O cycle to occupy the excess capacity $M_{max} - M_{active}$ for each disk using a particular algorithm. For example, the I/O transactions for the start-up data of new streams and the I/O transactions of already active streams may be sorted together or there may be separate subcycles for start-up data of new streams and already active streams.

In short, a method for operating a disk storage system to simultaneously maintain the continuity of a plurality of streams has been disclosed. Finally, the above-described embodiments of the invention are intended to be illustrative only. Numerous alternative embodiments may be devised by those skilled in the art, without departing from the spirited scope of the following claims.

We claim:

1. A method for scheduling I/O transactions for a data storage system comprising $N_d$ storage units, said data storage system storing data for a plurality of full motion video streams, each of said streams having a bit rate of $(A/B)W_{base}$ where A and B are integers chosen independently for each of said streams, said method comprising the steps of maintaining the continuity of said full motion video streams simultaneously by performing for each of said streams A I/O transactions in each of said $N_d$ storage units within each set of B I/O cycles in a sequence of sets of B I/O cycles, each I/O cycle having a duration of $N_d S/W_{base}$, in each of said I/O transactions a segment of S bits is retrieved from one of said storage units or written into one of said storage units, the duration of each I/O transaction being shorter than $S/W_{base}$;

for streams in which segments are retrieved from said storage system, the segments of a stream retrieved from said storage system in each particular set of B I/O cycles being consumed in a particular set of B consumption cycles in a sequence of sets of B consumption cycles, the particular set of B consumption cycles beginning after the first I/O transaction is performed for the stream in the particular set of B I/O cycles, the duration of a consumption cycle being $N_d S/W_{base}$;

for streams in which segments are written into said storage system, the segments of a stream written into said storage system in each particular set of B I/O cycles being produced in a particular set of B production cycles in a sequence of sets of B production cycles, the particular set of B production cycles ending prior to performing the last I/O transaction for the stream in the particular set of B I/O cycles; the duration of a production cycle being $N_d S/W_{base}$.

2. The method of claim 1 wherein said storage system is located in a communications network.

3. The method of claim 1 wherein the network produces or consumes $W_{base}$ bits/sec for each of the streams.

4. The method of claim 1 wherein said streams share buffer capacity in a local buffer.

5. The method of claim 1
wherein said streams are divided into G groups,
wherein the production or consumption cycles of the streams within each group are aligned with each other, but the production and consumption cycles of successive groups are offset from the production and consumption cycles of the previous group by $(1/G)^{th}$ of an I/O cycle, and wherein each I/O cycle is divided into G I/O subcycles of duration $N_d S/W_{base} G$.

6. The method of claim 5 wherein in each I/O subcycle there is one I/O transaction performed in each storage unit for each stream in the group whose production or consumption cycle begins immediately after the subcycle.

7. The method of claim 5 wherein in each subcycle, one I/O transaction is performed for each stream in each of $N_d$ groups.

8. The method of claim 1 wherein the number of I/O transactions performed in each I/O cycle for each storage unit for active streams does not exceed a predetermined number.

9. The method of claim 8 further comprising the step of activating one or more new streams if the number of I/O transactions performed in each I/O cycle for each storage unit for active streams is less than said predetermined number.

10. The method of claim 9 wherein excess capacity for I/O transactions in said storage units is used for start-up data for said newly activated streams.

11. The method of claim 9 wherein new streams are activated according to a predetermined service discipline.

12. The method of claim 11 wherein the predetermined service discipline is chosen from the group comprising first-come-first-served, round robin, last-come-first-served, and shortest job first.

13. The method of claim 10 wherein in each I/O cycle, the I/O transactions of previously active streams and I/O transactions for the start-up data of newly activated streams are sorted together.

14. The method of claim 10 wherein in each I/O cycle, the I/O transactions of previously active streams are sorted and performed in one subcycle and the I/O transactions for the start-up data of newly activated streams are separately sorted and performed in a separate subcycle.

15. The method of claim 1 wherein said network is a local area network.

16. The method of claim 1 wherein said streams contain video data.

17. The method of claim 1 wherein I/O transactions for said streams have a predetermined order which does not change from one I/O cycle to the next.

18. The method of claim 1 wherein the I/O transactions have an order which is separately determined for each I/O cycle.

19. The method of claim 1 wherein the storage system is a Redundant Array of Inexpensive Disks.

20. The method of claim 1 wherein B has a fixed value for all streams $N_{super}$, where $N_{super}$ is an integer.

21. The method of claim 1 wherein segments of said streams are allocated to the storage units in said array in a regular cyclic pattern.

22. The method of claim 1 wherein for each stream the A I/O transactions for each storage unit are uniformly spread in B I/O cycles.

23. The method of claim 20 wherein $N_{super}$ I/O cycles form a supercycle, wherein in each I/O cycle of a supercycle, for each stream L stripes are fetched from or written into said storage system, wherein each stripe comprises one segment of S bits fetched from or written into each of said $N_d$ storage units, and wherein for each stream the variance of the number L over the cycles of a supercycle is minimized.

24. The method of claim 23 wherein the variance of the total number of stripes fetched from or written into said storage system, for all of said streams in each cycle of a supercycle is minimized.

25. The method of claim 1 wherein segments are grouped into data stripes of $N_d$ consecutive segments, wherein said array is organized into bin stripes comprising locations in each of said $N_d$ storage units, and wherein data stripes are randomly allocated to bin stripes.

26. A method for scheduling I/O transactions for a data storage system comprising $N_d$ storage units to enable full motion video streams to be written into said data storage system and to be retrieved from said data storage system, said data storage system storing data for a plurality of said full motion video streams, said streams being divided into G groups, said method comprising the steps of:

maintaining simultaneously the continuity of said full motion video streams to be written into said data storage system and to be retrieved from said data storage system by performing for each of said streams a predetermined number of I/O transactions in each of said $N_d$ data storage units in each of a plurality of successive I/O cycles, each I/O cycle having a duration of $N_d S/W_{base}$, where S is a number of bits and $W_{base}$ is a basic rate, in each of said I/O transactions a segment of S bits is retrieved from one of said storage units or written into one of said storage units, the duration of an I/O transaction being shorter than the duration of an I/O cycle so that multiple I/O transactions can be scheduled for each said data storage unit in an I/O cycle, for streams in which segments are retrieved from said storage system, the segments of a stream being retrieved from the storage system in each particular I/O cycle being consumed in a particular consumption cycle in a sequence of consumption cycles, the particular consumption cycle beginning after a first I/O transaction for the stream in the particular I/O cycle, for streams in which segments are written into said storage system, all of the segments of a stream being written into the storage system in each particular I/O cycle being produced in a particular production cycle in a sequence of production cycles, the particular production cycle ending prior to a last I/O transaction for the stream in the particular I/O cycle, and wherein the production or consumption cycles of the streams within each group are aligned with each other, but the production and consumption cycles of successive groups are offset from the production and consumption cycles of the previous group by $(1/G)^{th}$ of an I/O cycle, and wherein each I/O cycle is divided into G I/O subcycles of duration $N_a S/W_{base} G$.

* * * * *